UNITED STATES PATENT OFFICE.

PETER TOWNSEND AUSTEN, OF NEW BRUNSWICK, NEW JERSEY, ASSIGNOR TO THE WILLIAM J. MATHESON & COMPANY, LIMITED, OF NEW YORK, N. Y.

SOLID COLORING-MATTER FROM FUSTIC AND PROCESS OF PREPARING SAME.

SPECIFICATION forming part of Letters Patent No. 492,368, dated February 21, 1893.

Application filed January 10, 1893. Serial No. 457,931. (No specimens.)

*To all whom it may concern:*

Be it known that I, PETER TOWNSEND AUSTEN, a citizen of the United States, and a resident of New Brunswick, in the county of Middlesex and State of New Jersey, have invented a certain new and useful Process of Producing a Solid Coloring-Matter from Fustic, of which the following is a specification.

The usual form in which fustic comes into the market is in the form of chips, and liquid or so-called solid extracts. The chips have the disadvantage that they are bulky, and require to be extracted with water in order to obtain the coloring matter. The liquid extract is of a sticky and disagreeable consistence, is liable to leak from the barrels, more or less adheres to the barrels when emptying, thus occasioning a loss; it is not easily soluble in cold water, and requires vigorous stirring in hot water to effect a solution. It is difficult to weigh out with exactness. The liquid extract unless fresh contains a large part of the coloring matter in the form of a precipitate, which makes it necessary to stir and mix the liquid and the precipitate in order to get an even sample, and if this is not done well, samples taken at different times from the same barrel may give different results in dyeing. On long standing and especially when subjected to cold, the solid coloring matter in the extract may settle to the bottom of the barrel forming a heavy mass, which it is difficult to mingle with the liquid portion of the extract, and thus cause loss of valuable matter and much difficulty in dyeing. The so-called solid extracts are really of a heavy pitchy consistence and are made by continuing the evaporation as far as possible in the pan. They are affected by atmospheric temperature, becoming softer in hot weather. They are hard to cut or break into pieces, and are practically insoluble in cold water, and difficultly soluble in hot water, requiring boiling and stirring to effect a solution.

The new product which I obtain by my process is brittle and easy to break up or pulverize, thus allowing it to be used like an aniline dye, and to be easily mixed with other dry coloring matters and is soluble in hot or cold water. It can be easily weighed out with exactness. It can be packed and shipped without loss. It dyes on chromed wool the characteristic old gold color of fustic, but on alumed wool it dyes instead of a yellow color with greenish reflex of fustic a brownish yellow. The color on chromed wool is stronger than that dyed by the extract evaporated by itself.

My process for making a solid, brittle, or friable coloring matter from fustic is substantially as follows:—To liquid extract of fustic of about 60° Twaddle, and at a temperature of about 120° Fahrenheit, about three per cent. of nitrite of soda dissolved in water is added, and the whole well mixed. The mixture is then allowed to stand for about an hour, during which a reaction takes place, which is attended with the evolution of nitrogen gas. The mass is then dried in suitable apparatus at a temperature of 120-150° Fahrenheit. After drying the mass appears as a brittle, more or less porous mass, easily powdered, dry and not affected by atmospheric temperature or humidity, and having the properties and advantages hereinbefore described.

The foregoing is the best method known to me of carrying out my invention or discovery, the essence of which is the combination of an alkaline nitrite with extract of fustic under such conditions as will bring about a reaction between them.

Having thus described my invention, what I claim as new, and desire to patent, is—

1. The process of producing an extract of fustic, which consists in adding to fustic extract an alkaline nitrite in the presence of water and causing a reaction between the nitrite and the extract, substantially as described.

2. The process of producing an extract of fustic, which consists in adding to fustic extract an alkaline nitrite in the presence of water, causing a reaction between the nitrite and the extract and evaporating the product to dryness, substantially as described.

3. As a new article of manufacture, a coloring matter derived from extract of fustic by incorporation therewith of an alkaline nitrite and characterized by the properties of being a friable solid soluble in hot or cold water, as described.

Signed at New York city, in the county of New York and State of New York, this 7th day of January, A. D. 1893.

PETER TOWNSEND AUSTEN.

Witnesses:
  GEO. B. DEANE,
  W. J. MATHESON.